US008958399B1

(12) United States Patent
Hernacki et al.

(10) Patent No.: US 8,958,399 B1
(45) Date of Patent: Feb. 17, 2015

(54) METHOD AND APPARATUS FOR PROVIDING CONNECTIVITY CONTROL

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 813 days.

(21) Appl. No.: 11/540,816

(22) Filed: Sep. 28, 2006

(51) Int. Cl.
*H04W 12/12* (2009.01)

(52) U.S. Cl.
USPC ............................ 370/338; 455/406; 455/408

(58) Field of Classification Search
CPC ... H04W 84/045; H04W 12/08; H04W 12/12; H04W 4/02; H04W 12/06; H04W 48/02; H04W 48/08; H04W 84/12; H04L 63/02; H04L 63/1433; H04L 63/1441; H04L 67/22; H04L 67/125; H04L 63/10; H04M 15/8033; H04M 15/00; H04M 15/88
USPC ........ 370/338, 352, 328; 455/525, 522; 726/4
See application file for complete search history.

(56) References Cited

U.S. PATENT DOCUMENTS

| 7,333,481 | B1 * | 2/2008 | Rawat et al. .................. 370/352 |
| 2005/0259611 | A1 * | 11/2005 | Bhagwat et al. .............. 370/328 |
| 2006/0002331 | A1 * | 1/2006 | Bhagwat et al. .............. 370/328 |
| 2006/0153153 | A1 * | 7/2006 | Bhagwat et al. .............. 370/338 |
| 2006/0164199 | A1 * | 7/2006 | Gilde et al. ................... 336/234 |
| 2007/0049323 | A1 * | 3/2007 | Wang et al. ................... 455/525 |

FOREIGN PATENT DOCUMENTS

EP       1753180 A1 *   2/2007

* cited by examiner

*Primary Examiner* — George Eng
*Assistant Examiner* — Jing Gao
(74) *Attorney, Agent, or Firm* — Wilmer Cutler Pickering Hale and Dorr LLP

(57) ABSTRACT

A method and apparatus for controlling connectivity within a wireless network. In one embodiment, connectivity control device is provided within the wireless network to disrupt the communications with neighboring nodes of any computer within a protected network. In one embodiment of the invention, all of the wireless computers within a network are logged within the connectivity control device e.g., the wireless interface card identification number is logged. When a computer within the protected network attempts to connect to a neighboring wireless node, the connectivity control device transmits a signal that disrupts the communication with a neighboring wireless node. This disruption may occur by sending a disjoin frame or signal, or other form of communication, to disconnect the unauthorized access. In another embodiment of the invention, the connectivity control device may transmit disruptive communications continuously to ensure that the computers that are not authorized for access to the neighboring wireless node cannot connect to the neighborhood wireless nodes.

20 Claims, 3 Drawing Sheets

METHOD AND APPARATUS FOR PROVIDING CONNECTIVITY CONTROL

BACKGROUND OF THE INVENTION

1. Field of the Invention

Embodiments of the present invention generally relate to wireless networks and, more particularly, to a method and apparatus for controlling connectivity to a wireless network.

2. Description of the Related Art

Within enterprises and homes wireless networks have become very popular. They provide a technique for users to set up networks very quickly without providing infrastructure via cables throughout the home or corporate facilities. Wireless networks have now appeared densely in many areas such that a user can connect to a number of networks from a single location. In some instances, these networks may be set up by themselves or they may be networks of others. Parents as well as corporate IT managers attempt to limit their network users, e.g., children or employees, access to certain content or other information for both safety reasons as well as security within the corporation or home. Often employed to limit access are content filters, instant messaging gateways, firewall controls, and other techniques for controlling access to information. In many instances, when a laptop with a wireless connection is utilized by an employee or child, they may avoid these content filters and other attempts at limiting their access by connecting through a neighboring wireless network node rather than a network node that contains the controls.

Therefore, there is a need in the art for a method and apparatus for controlling circumvention of wireless network content controls by controlling the connectivity of users of a wireless network.

SUMMARY OF THE INVENTION

The present invention provides a method and apparatus for controlling connectivity within a wireless network. A connectivity control device is provided within the wireless network to disrupt the communications with neighboring nodes of any computer within a protected network. In one embodiment of the invention, all of the wireless computers within a network are logged within the connectivity control device e.g., the wireless interface card identification number is logged. When a computer within the protected network attempts to connect to a neighboring wireless node, the connectivity control device transmits a signal that disrupts the communication with a neighboring wireless node. This disruption may occur by sending a disjoin frame or signal, or other form of disruptive communication, to disconnect the unauthorized access. In another embodiment of the invention, the connectivity control device may transmit disruptive communications continuously to ensure that the protected computers cannot connect to the neighboring wireless nodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
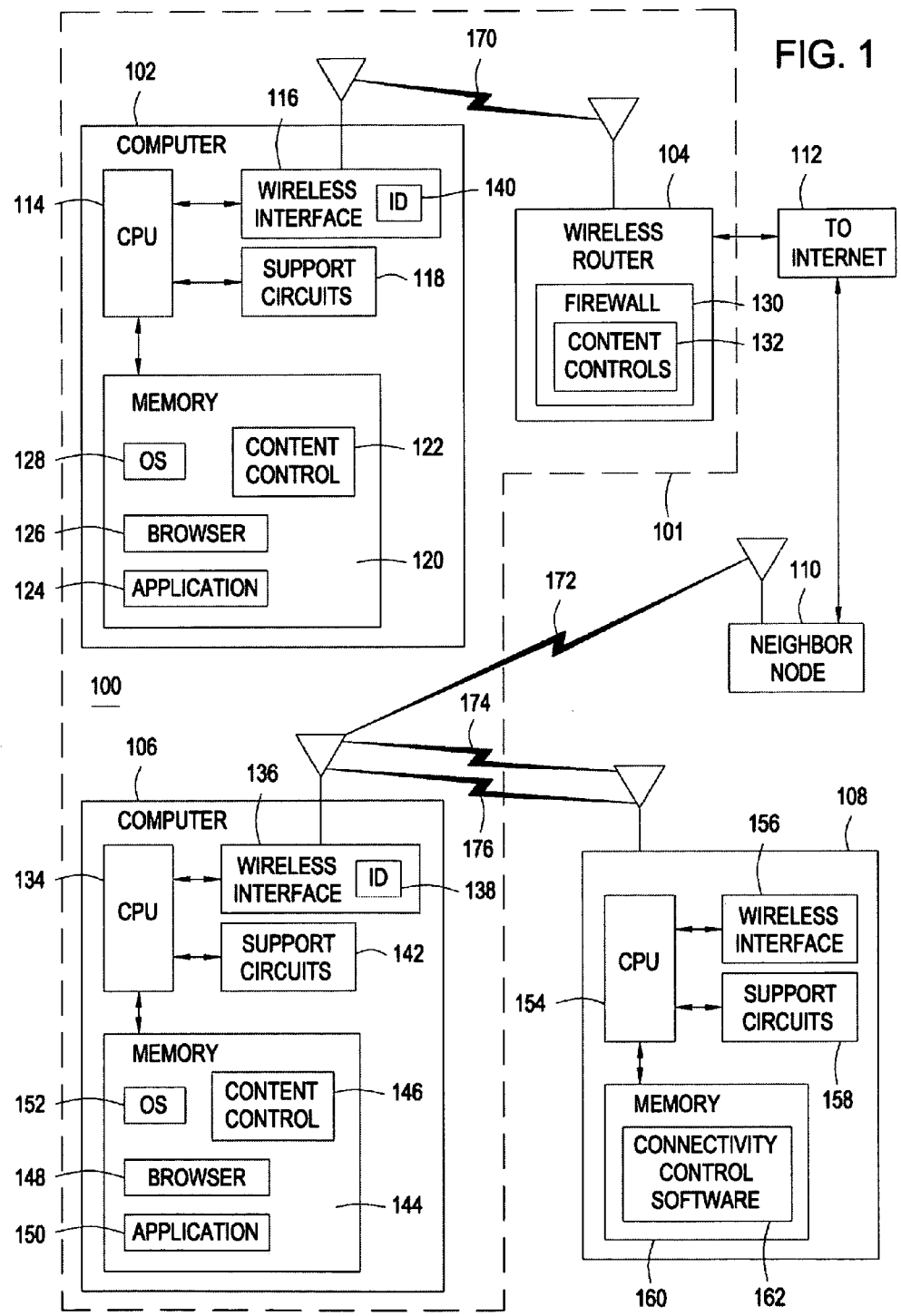
FIG. 1 is a block diagram of a wireless communication system comprising a connectivity control device in accordance with one embodiment of the present invention.

FIG. 1 depicts a wireless network system 100 comprising a computer 102 and a second computer 106, a wireless router 104, at least one neighborhood wireless node 110, and a connectivity control device 108. A protected network 101, formed by the connectivity control device 108, comprises computers 102 and 106 and a wireless router 104. The computers 102 and 106 may be laptop computers, desk top computers, personal digital assistants (PDAs), or any other form of wireless device that accesses content on another computer or network.

The wireless computers 102 and 106 comprise central processing units (CPU) 114, 134, wireless interface circuits (or cards) 116, 136, support circuits 118, 142, and memory 120, 144. The central processing unit 114, 134 may be one or more of many commercially available microprocessors and/or microcontrollers. The wireless interface cards 136, 116 are standard wireless interface cards that communicate using WiMAX, WiFi, or any other wireless protocol. The wireless protocol that is used is irrelevant to the invention. The support circuits 118, 142 are designed to facilitate functionality of the CPU 114, 134 and comprise such circuits as cache, power supplies, clock circuits, and the like. Memory 120, 144 may be any one of many types of memory that are used to store digital information. Such memory includes random access memory, read-only memory, disk drives, optical memory, removable memory, and the like. The memory 120, 144 comprises an operating system 128, 152, content control information 122, 146, browser 126, 148, application software 124, 150.

The computer 102 is shown as communicating through wireless path 170 to a wireless router 104. This is an authorized access from the computer 102 to the wireless route 104. The wireless router 104 comprises a firewall 130 that may contain content control software 132. The parental control software would limit the access of the computer 102 to certain websites and/or content from the Internet 112 or other computers within the network. The content controls are established through content control software 122 as well as content controls 132 within the firewall 130. As such, when a user utilizes the browser 126 or other application software 124, to access the internet 112 or other computers, the content control software 122 within the computer 102 as well as within the firewall 132, monitors and controls as well as limits the access to content and websites within the Internet 112 and/or other computers. Although content control software is described as being used in the computer 102 and the firewall 130, in many applications, such controls are only used in one location or the other.

Computer 106, on the other hand, is attempting to avoid the contact controls 132 of the wireless router 104 by accessing a neighbor wireless node 110 that is outside the protected network 101. This access is attempted through path 172. If such access were permitted, the computer 106 would avoid the content controls within the firewall 130.

In accordance with one embodiment of the invention, a connectivity control device 108 is positioned within the network system 100 to form the protected network 101. This connectivity control device 108 supervises the network communications and ensures that the computers 102 and 106 cannot connect to a neighbor wireless node 110, avoiding the content controls. The connectivity control device 108 monitors the network traffic, and when a computer such as computer 106, attempts to connect to a neighbor node in an unauthorized manner, the connectivity control device 108 disrupts that communication to ensure that the computer 106 cannot avoid the content controls within the firewall 130.

In one embodiment of the invention, the connectivity control device 108 comprises a central processing unit 154, a wireless interface circuit 156, support circuits 158, and memory 160. The central processing unit 154 is one or more commercially available microcontrollers or microprocessors. The wireless interface circuit 156 provides connectivity to allow monitoring and transmission on the protected wireless network 101 and to the neighboring node 110. The support circuits 158 provide functionality for the CPU 154 including such circuits as cache, power supplies, clock circuits, network interface, and the like. The memory 160 comprises the connectivity control software 162. The connectivity control software 162, when executed by the CPU, monitors the traffic within the wireless network 100, and when a transmission such as 172 is detected via path 174, the connectivity control device 108 transmits a signal 176 to disrupt the communication between the computer 106 and the unauthorized neighboring wireless node 110. This transmission may be a "disjoin frame", if the wireless network is a "WiFi" (IEEE 802.11 family of protocols) wireless network. In other types of networks, the transmission to disrupt a communication may be other forms of transmissions.

Figure 2:
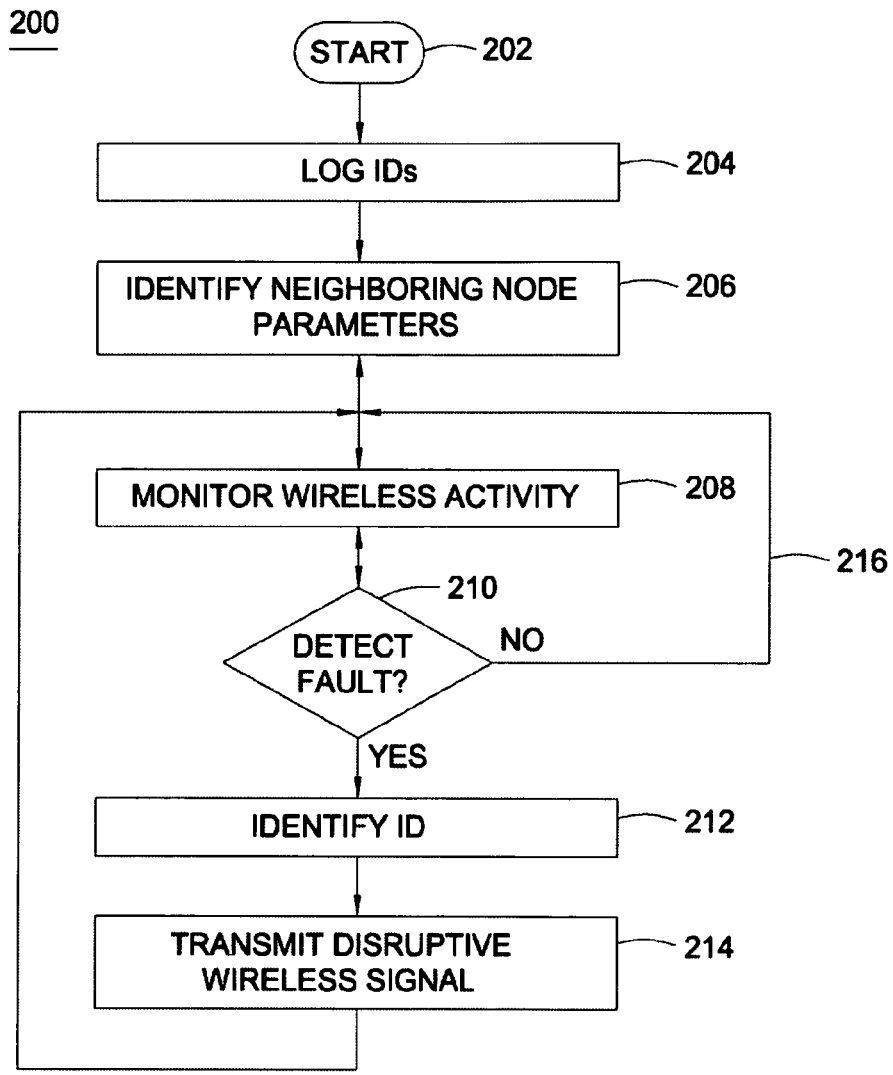
FIG. 2 depicts a flow diagram of a method of operation of one embodiment of the connectivity control device.

FIG. 2 depicts a method 200 of operation of one embodiment of the connectivity control software 162 when executed by the CPU 154 of the connectivity control device 108. The connectivity control method 200 begins at step 202 and proceeds to step 204. At step 204, the operator that establishes the operation of the connectivity control device 108, logs the wireless interface identifiers 104 and 138 of FIG. 1 into the connectivity control software 162. These identifiers are provided to identify the computers that are authorized to be within the protected wireless network 101 and are being limited from accessing unauthorized neighboring wireless nodes. Generally, these identification numbers can be entered manually, or an automated system may be provided.

Once the identifications have been entered, at step 204, the connectivity control device 108 monitors all wireless communication to identify the transmission parameters of all access points (neighboring nodes) in the vicinity. Once the parameters are known, the device 108 can monitor the channels used by the neighboring nodes 110. With the neighboring node channels and the interface identifiers of the protected computers known, the device 108 is able to monitor the wireless activity of the wireless network at step 206. Generally, the device 108 listens to the communications between the computers and router(s) to ensure that a connection to an unauthorized neighboring wireless node is not being attempted. The device 108 monitors the traffic and identifies the communication frames which have certain wireless interface IDs that show that there is a connection to a neighbor node being performed where the neighboring wireless node is an unauthorized connection. Once a "fault" is detected, at step 208, the method 200 will cease looping through path 214 and proceed to step 210. At step 210, the device 108 identifies which computer is attempting the unauthorized communication. In one embodiment, the connectivity control device 108 monitors the interface ID contained in the communication sent during the unauthorized communication. Once the computer that is attempting the unauthorized access is identified, the method 200 transmits a disruptive wireless signal at step 212. This disruptive wireless signal will generally be at least one disjoin frame (forged packets to cause the association to be discontinued) for a WiFi-based wireless network. The WiFi frame that has a disjoin command would cause the unauthorized neighboring wireless node to disconnect the computer that is performing the unauthorized access.

The connectivity control device 108 may be a firewall, a wireless access point, or a computer within the wireless network 100. Any such device may perform the listening and disruptive communications to ensure that the system controls the connectivity of the users.

Figure 3:
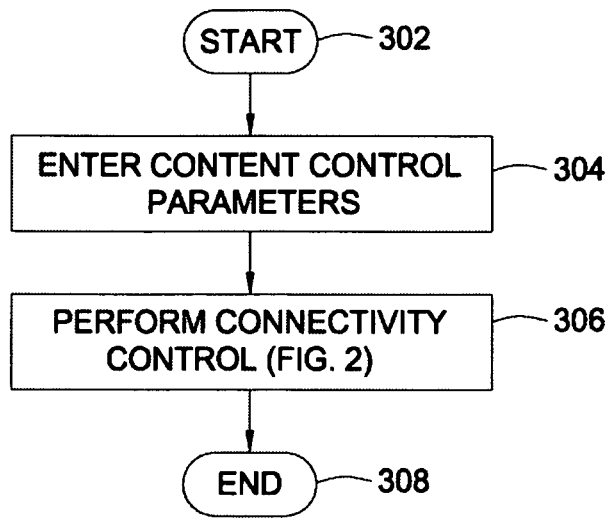
FIG. 3 depicts a flow diagram of a method for providing parental controls for the connectivity control device in accordance with one embodiment of the invention.

FIG. 3 depicts a method 300 of an alternative operation of the device 108. The method 300 begins at Step 302 and proceeds to Step 304 where an operator may enter content control parameters. These content control parameters may control the connectivity control device 108 to only provide such connectivity control during certain times of the day, during a certain number of hours per day, to only certain users and the like. Such content control parameters are well known in the art and any such control parameters that are known may be utilized in step 304. Once the connectivity control parameters are entered, then the method 300 proceeds to step 306 where the method 200 of FIG. 2 is performed to control the connectivity of the wireless computers within the network 100. The method ends at step 308. In this manner, parents and/or information technology managers may control access to unauthorized networks.

Figure 4:
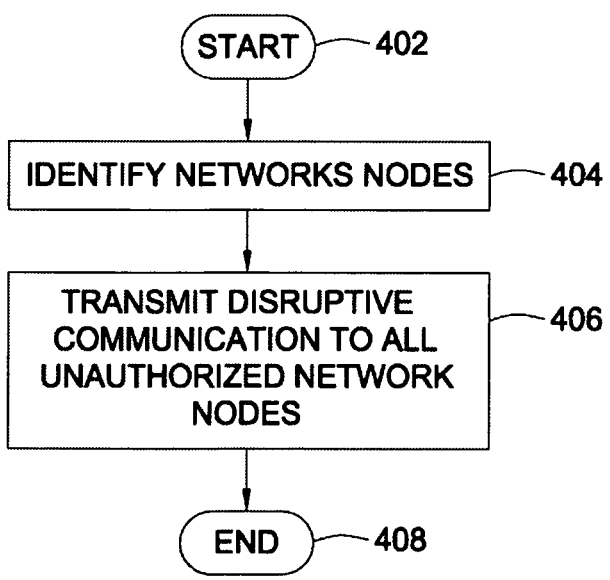
FIG. 4 depicts a flow diagram of a method of operation of an alternative embodiment of the connectivity control device.

FIG. 4 depicts an alternative method 400 for controlling connectivity within a wireless network. The method 400 starts at step 402 and proceeds to step 404, wherein the connectivity control device monitors the network and the neighbors and identifies a list of network nodes that can be accessed by a user within a wireless network. These network nodes will include the authorized network node as well as network nodes that are unauthorized. Once the unauthorized network nodes are identified in step 404 and the channels on which those network nodes operate are identified, the method 400 proceeds to step 406, wherein disjoin frames or other disruptive communications are transmitted to all protected computers on a continuous basis. In this manner, the disruptive communications ensure that the wireless computers having the identifiers that are known to the connectivity control device will not be able to join with (or otherwise communicate with) the unauthorized neighbor nodes. The transmission and reception of disjoin frames or other such transmissions at the neighbor nodes does not impact the operation of those nodes in any way. The disruptive communications are sent to the protected computers such that those computers are impeded from connecting to the unauthorized neighbor nodes. The method 400 ends at step 408.

While the foregoing is directed to embodiments of the present invention, other and further embodiments of the invention may be devised without departing from the basic scope thereof, and the scope thereof is determined by the claims that follow.

The invention claimed is:
1. A method for controlling connectivity based on content within a first wireless network comprising:
    receiving, using parental control software implemented on a firewall, content control parameters;

monitoring, using a connectivity control device separate from the firewall and outside of a protected network, access to one or more websites based on the content control parameters;

logging a plurality of wireless identifiers of computers within the first wireless network into the connectivity control device;

identifying at least one computer as a protected computer using a logged wireless identifier of the plurality of logged wireless identifiers;

determining, based on the content control parameters of the parental control software of the firewall, that connectivity controls are to be enforced with the at least one protected computer associated with a specified user for a current time period;

identifying, via at least one computer processor, at least one unauthorized access attempt of the at least one protected computer to an unauthorized wireless access point that is within wireless communication range of the at least one protected computer and outside of the protected network, wherein identifying the at least one unauthorized access attempt comprises determining that the unauthorized wireless access point is not on a list of authorized network nodes;

identifying one or more channels used by the unauthorized wireless access point; and continuously transmitting, using the connectivity control device separate from the firewall and outside of the protected network, a disruptive wireless signal to the unauthorized wireless access point to disrupt a communication between the at least one protected computer and the unauthorized wireless access point in response to the identified unauthorized access attempt of the at least one protected computer to the unauthorized wireless access point and the determination that the connectivity controls for the at least one protected computer are to be enforced based on the content control parameters, wherein the continuously transmitted disruptive wireless signal disrupts the communication between the at least one protected computer and the unauthorized access point, and wherein, in an event a second protected computer that is not enforced based on the content control parameter, communications between the second protected computer and the unauthorized wireless access point are not disrupted.

2. The method of claim 1, wherein the content controls parameters for the specified user associated with the at least one protected computer are specified based on a time of day.

3. The method of claim 1, wherein the content controls parameters for the specified user associated with the at least one protected computer are specified based on number of hours of network access per day.

4. The method of claim 1, wherein the content controls parameters for the specified user associated with the at least one protected computer are specified by a parent of the specified user.

5. The method of claim 1, wherein the content controls parameters for the specified user associated with the at least one protected computer are specified by an information technology manager.

6. The method of claim 1, wherein the at least one protected computer is any electronic device that accesses content from a network or on another computer.

7. The method of claim 1, wherein the at least one protected computer comprises a personal digital assistant.

8. The method of claim 1, wherein the at least one protected computer comprises at least one of a laptop computer, and a desktop computer.

9. An article of manufacture for controlling connectivity based on content within a first wireless network, the article of manufacture comprising:

at least one non-transitory processor readable storage medium; and instructions carried on the at least one non-transitory processor readable storage medium;

wherein the instructions are configured to be readable from the at least one non-transitory processor readable storage medium by at least one processor and thereby cause the at least one processor to operate so as to:

receive, using parental control software implemented on a firewall, content control parameters;

monitor, using a connectivity control device separate from the firewall and outside of a protected network, access to one or more websites based on the content control parameters;

log a plurality of wireless identifiers of computers within the first wireless network into the connectivity control device;

identify at least one computer as a protected computer using a logged wireless identifier of the plurality of logged wireless identifiers;

determine, based on the content control parameters of the parental control software of the firewall, that connectivity controls are to be enforced with the at least one protected computer associated with a specified user for a current time period;

identify at least one unauthorized access attempt of the at least one protected computer to an unauthorized wireless access point that is within wireless communication range of the at least one protected computer and outside of the protected network, wherein identifying the at least one unauthorized access attempt comprises determining that the unauthorized wireless access point is not on a list of authorized network nodes;

identify one or more channels used by the unauthorized wireless access point; and continuously transmit, using the connectivity control device separate from the firewall and outside of the protected network, a disruptive wireless signal to the unauthorized wireless access point to disrupt a communication between the at least one protected computer and the unauthorized wireless access point in response to the identified unauthorized access attempt of the at least one protected computer to the unauthorized wireless access point and the determination that the connectivity controls for the at least one protected computer are to be enforced based on the content control parameters, wherein the continuously transmitted disruptive wireless signal disrupts the communication between the at least one protected computer and the unauthorized access point, and wherein, in an event a second protected computer that is not enforced based on the content control parameters, communications between the second protected computer and the unauthorized wireless access point are not disrupted.

10. The article of manufacture of claim 9, wherein the content controls parameters for the specified user associated with the at least one protected computer are specified based on a time of day.

11. The article of manufacture of claim 9, wherein the content controls parameters for the specified user associated with the at least one protected computer are specified based on number of hours of network access per day.

12. The article of manufacture of claim 9, wherein the content controls parameters for the specified user associated with the at least one protected computer are specified by a parent of the specified user.

13. The article of manufacture of claim 9, wherein the content controls parameters for the specified user associated with the at least one protected computer are specified by an information technology manager.

14. The article of manufacture of claim 9, wherein the at least one protected computer is any electronic device that accesses content from a network or on another computer.

15. The article of manufacture of claim 9, wherein the at least one protected computer comprises a personal digital assistant.

16. The article of manufacture of claim 9, wherein the at least one protected computer comprises at least one of a laptop computer, and a desktop computer.

17. A system for controlling connectivity based on content within a first wireless network, comprising:
   one or more processors communicatively coupled to a network;
   wherein the one or more processors are configured to:
   receive, using parental control software implemented on a firewall, content control parameters;
   monitor, using a connectivity control device separate from the firewall and outside of a protected network, access to one or more websites based on the content control parameters;
   log a plurality of wireless identifiers of computers within the first wireless network into the connectivity control device;
   identify at least one computer as a protected computer using a logged wireless identifier of the plurality of logged wireless identifiers;
   determine, based on the content control parameters of the parental control software of the firewall, that connectivity controls are to be enforced with the at least one protected computer associated with a specified user for a current time period;
   identify at least one unauthorized access attempt of the at least one protected computer to an unauthorized wireless access point that is within wireless communication range of the at least one protected computer and outside of the protected network, wherein identifying the at least one unauthorized access attempt comprises determining that the unauthorized wireless access point is not on a list of authorized network nodes;
   identify one or more channels used by the unauthorized wireless access point; and
   continuously transmit, using the connectivity control device separate from the firewall and outside of the protected network, a disruptive wireless signal to the unauthorized wireless access point to disrupt a communication between the at least one protected computer and the unauthorized wireless access point in response to the identified unauthorized access attempt of the at least one protected computer to the unauthorized wireless access point and the determination that the connectivity controls for the at least one protected computer are to be enforced based on the content control parameters of the parental control software of the firewall, wherein the continuously transmitted disruptive wireless signal disrupts the communication between the at least one protected computer and the unauthorized access point, and wherein, in an event a second protected computer that is not enforced based on the content control parameters, communications between the second protected computer and the unauthorized wireless access point are not disrupted.

18. The system of claim 17, wherein the content controls parameters for the specified user associated with the at least one protected computer are specified based on a time of day.

19. The system of claim 17, wherein the content controls parameters for the specified user associated with the at least one protected computer are specified by based on number of hours of network access per day.

20. The system of claim 17, wherein the at least one protected computer comprises a personal digital assistant.

* * * * *